US005082498A

United States Patent [19]

Kurtz et al.

[11] Patent Number: 5,082,498

[45] Date of Patent: Jan. 21, 1992

[54] HIGHLY CONCENTRATED SOLID PIGMENT FORMULATIONS

[75] Inventors: Walter Kurtz, Bad Duerkheim; Karl Muench, Beindersheim; Joachim Kranz; Horst Belde, both of Ludwigshafen, all of Fed. Rep. of Germany

[73] Assignee: BASF Aktiengesellschaft, Ludwigshafen, Fed. Rep. of Germany

[21] Appl. No.: 529,437

[22] Filed: May 29, 1990

[30] Foreign Application Priority Data

Jun. 21, 1989 [DE] Fed. Rep. of Germany ....... 3920251

[51] Int. Cl.[5] ............................................. C08K 13/08

[52] U.S. Cl. .................................... 106/499; 106/408; 106/413; 106/447; 106/461; 106/493; 106/497; 252/318; 252/351; 252/357

[58] Field of Search ............... 106/186, 447, 460, 408, 106/413, 497, 493, 499; 252/318, 351, 357, 355, DIG. 1

[56] References Cited

U.S. PATENT DOCUMENTS 2,979,528 4/1961 Lundsted ...................... 252/DIG. 1
3,841,888 10/1974 Belde et al. ......................... 106/497
3,947,287 3/1976 Belde et al. ......................... 106/493
3,960,486 6/1976 Daubach et al. ....................... 8/908
4,414,032 11/1983 Schrattenholz et al. ........... 106/186
4,464,203 8/1984 Belde et al. ......................... 106/413

FOREIGN PATENT DOCUMENTS 0084645 8/1983 European Pat. Off. .
325054 7/1989 European Pat. Off. .
58-111893 7/1983 Japan .
1603142 11/1981 United Kingdom .

*Primary Examiner*—William R. Dixon, Jr.
*Assistant Examiner*—Scott L. Hertzog
*Attorney, Agent, or Firm*—Oblon, Spivak, McClelland, Maier & Neustadt

[57] ABSTRACT

Solid pigment formulations containing from 70 to 97% by weight, based on the total weight of the formulation, of one or more pigments and also from 3 to 30% by weight, based on the total weight of the formulation, of at least one surfactant which is an adduct of ethylene oxide and optionally propylene oxide with ethylenediamine, the proportion of ethylene oxide being from 46 to 100% by weight, based on the total weight of ethylene oxide and propylene oxide in the adduct, and the adduct having an average molecular weight of from 5000 to 40,000, are useful for pigmenting printing ink and gloss paint compositions.

9 Claims, No Drawings

HIGHLY CONCENTRATED SOLID PIGMENT FORMULATIONS

The present invention relates to novel solid pigment formulations containing from 70 to 97% by weight, based on the total weight of the formulation, of one or more pigments and also from 3 to 30% by weight, based on the total weight of the formulation, of at least one surfactant which is an adduct of ethylene oxide and optionally propylene oxide with ethylenediamine, the proportion of ethylene oxide being from 46 to 100% by weight, based on the total weight of ethylene oxide and propylene oxide in the adduct, and the adduct having an average molecular weight of from 5000 to 40,000.

EP-A-84 645 already discloses pigment formulations which, based on the total weight of the formulation, contain from 70 to 95% by weight of pigment and from 5 to 30% by weight of at least one surface-active solid agent obtained by reacting ethylenediamine with propylene oxide and then with ethylene oxide, the ethylene oxide content, based on the block copolymer, being from 30 to 45% by weight and the block copolymer having an average molecular weight of from 11,000 to 15,000.

It has been found, however, that such pigment formulations still have application deficiencies, in particular poor oleofastness, storage stability, antiblocking and solvent retention properties.

It is an object of the present invention to provide new highly concentrated solid pigment formulations which are free of the disadvantages mentioned.

We have found that this object is achieved by the pigment formulations described in detail at the beginning.

Suitable pigments for use in the formulations according to the present invention are inorganic pigments, organic pigments and mixtures thereof, of which the organic pigments are preferred.

Inorganic pigments are for example iron oxides, titanium dioxides, carbon blacks, lead chromate/lead molybdate pigments, nickel titanium yellow pigments and chromium(III) oxide.

Organic pigments are for example those of the class of the monoazo pigments, eg. products derived from acetoacetarylide derivatives or from β-naphthol derivatives, laked monoazo dyes, eg. laked β-hydroxynaphthoic acid dyes, disazo pigments, fused disazo pigments, isoindoline derivatives, derivatives of naphthalene- or perylene-tetracarboxylic acid, anthraquinone pigments, thioindigo derivatives, azomethine derivatives, quinacridones, perinones, dioxazines, pyrazoloquinazolones, keto-containing polycyclic compounds having at least 4 fused aromatic and/or heteroaromatic rings, phthalocyanine pigments and laked basic dyes, eg. laked triarylmethane dyes.

Examples are the inorganic pigments Pigment Yellow 42, (C.I. 77 492), Pigment White 6 (C.I. 77 891), Pigment Red 101 (C.I. 77 491), Pigment Blue 27 (C.I. 77 510), Pigment Blue 29 (C.I. 77 007), and Pigment Black 7 (C.I. 77 266) and also the organic pigments Pigment Yellow 1 (C.I. 11 680), Pigment Yellow 3 (C.I. 11 710), Pigment Yellow 12 (C.I. 21 090), Pigment Yellow 13 (C.I. 21 100), Pigment Yellow 14 (C.I. 21 095), Pigment Yellow 16 (C.I. 20 040), Pigment Yellow 17 (C.I. 21 705), Pigment Yellow 34 (C.I. 77 603), Pigment Yellow 42 (C.I. 77 492), Pigment Yellow 74 (C.I. 11 741), Pigment Yellow 83 (C.I. 21 108), Pigment Yellow 106, Pigment Yellow 108 (C.I. 68 240), Pigment Yellow 113, Pigment Yellow 117, Pigment Yellow 126, Pigment Yellow 127, Pigment Yellow 139, Pigment Yellow 185, Pigment Orange 5 (C.I. 12 075), Pigment Orange 13 (C.I. 21 110), Pigment Orange 16 (C.I. 21 160), Pigment Orange 34 (C.I. 21 115), Pigment Orange 36 (C.I. 11 780), Pigment Orange 43 (C.I. 71 105), Pigment Orange 67, Pigment Red 3 (C.I. 12 120), Pigment Red 48:1 (C.I. 15 865:1), Pigment Red 48:4 (15 865:4), Pigment Red 49:1 (C.I. 15 630:1), Pigment Red 52:1 (C.I. 15 860:1), Pigment Red 53:1 (C.I. 15 585:1), Pigment Red 57 (C.I. 15 850), Pigment Red 104 (C.I. 77 605), Pigment Red 112 (C.I. 12 370), Pigment Red 122 (C.I. 73 915), Pigment Red 123 (C.I. 71 145), Pigment Red 146 (C.I. 12 485), Pigment Red 169 (C.I. 45 160:2), Pigment Red 170, Pigment Violet 19 (C.I. 46 500), Pigment Violet 23 (C.I. 51 319), Pigment Violet 27 (C.I. 42 555:3), Pigment Blue 1 (C.I. 42 595:2), Pigment Blue 15:1 (C.I. 74 160), Pigment Blue 15:3 (C.I. 74 160), Pigment Blue 15:6 (C.I. 74 160), Pigment Blue 16 (C.I. 74 100), Pigment Blue 61 (C.I. 42 765:1), Pigment Blue 62, Pigment Green 7 (C.I. 74 260), Pigment Green 8 (C.I. 10 008) and Pigment Green 36 (C.I. 74 265).

It is worth emphasizing in particular those pigment formulations which contain titanium dioxides or carbon blacks as inorganic pigments.

It is further worth mentioning in particular those pigment formulations which contain organic pigments comprising monoazo pigments, in particular those based on β-naphthol or β-hydroxynaphthoic acid, disazo pigments, in particular those based on dichlorobenzidine, with products having a coupling component from the acetoacetic ester or pyrazolone series deserving a particular mention, isoindoline pigments, phthalocyanine pigments, in particular copper phthalocyanine pigments, which may be chlorinated, and laked triarylmethane dyes, in particular those which have been laked with inorganic heteropolyacids.

The surfactants which are a further constituent of the pigment formulations according to the present invention are in general compounds known per se.

Suitable surfactants are those which are obtained by addition of ethylene oxide with or without propylene oxide to ethylenediamine. The ratio of ethylene oxide:-propylene oxide is selected to be such that the proportion of ethylene oxide is from 46 to 100% by weight, preferably from 60 to 90% by weight, in particular from 70 to 85% by weight, each percentage being based on the total weight of ethylene oxide and propylene oxide in the adduct. This means that the proportion of propylene oxide is from 0 to 54% by weight, preferably from 10 to 40% by weight, in particular from 15 to 30% by weight, each percentage being based on the total weight of ethylene oxide and propylene oxide in the adduct.

The average molecular weight of the adducts is in general from 5000 to 40,000, preferably from 11,000 to 40,000, in particular from 15,000 to 35,000.

If the surfactants contain propylene oxide as well as ethylene oxide, preference is given to those which are obtained by first adding the propylene oxide and then the ethylene oxide to the ethylenediamine.

As mentioned above, the surfactants are in general compounds known per se. They are largely commercially available or can be obtained by methods as mentioned for example in J. Falbe, U. Hasserodt, Katalysatoren, Tenside und Mineralöladditive, pages 145–147, Georg Thieme Verlag, Stuttgart, 1978.

In the pigment formulations according to the present invention, the proportion of pigment is from 70 to 97% by weight, preferably from 75 to 97% by weight, in particular from 80 to 95% by weight, each percentage being based on the total weight of the formulation. The proportion of surfactant is from 3 to 30% by weight, preferably from 3 to 25% by weight, in particular from 5 to 20% by weight, each percentage being based on the total weight of the formulation.

The pigment formulations according to the present invention may contain as further ingredients small amounts of water and further agents customary in pigment formulations in a minor amount (in general up to about 5% by weight, based on the total weight of the formulation). In some cases it can also be of advantage to increase the proportion of these agents to values above 5% by weight.

Such agents are used for example in the preparation of the formulations, for example in the dispersing of the pigments, or the isolation of the formulations, as auxiliaries. Suitable additives for these purposes are for example foam-preventing agents, aluminum hydroxide, acid acrylic resins and/or pH-regulating agents, such as buffer substances, acids or bases, eg. sulfonic acids or triethanolamine.

The formulation according to the present invention is preferably prepared by adding the surfactant to an aqueous pigment suspension. It is in general also possible to use those aqueous pigment suspensions which are obtained from the synthesis of the pigments.

A further preferred method of preparation comprises adding the surfactant to a press cake of the pigment, which is then treated in a commercial mixer.

The subsequent drying is effected in a conventional manner, for example by drying in a cupboard or by spray drying.

However, it is also possible to prepare the formulations from ready-produced pigment and surfactant by stirring, kneading or grinding in an aqueous medium, for example in a stirred or unstirred ball mill, in an attritor or in a sand or bead mill, and subsequently drying.

The novel formulations are suitable for pigmenting binder systems, for example acrylate resins, for a wide range of applications, for example for dyeing, coloring, staining or printing paper, wallpaper, decorative papers, aluminum foil, plasticized or unplasticized PVC, polyethylene, polypropylene, and natural or artificial leather.

They are suitable in particular for pigmenting aqueous or aqueous-alcoholic printing ink or gloss paint compositions. Suitable alcohols here are for example methanol, ethanol and isopropanol.

However, it is also possible to prepare print pastes for printing textile fabrics.

The compositions pigmented with the novel formulations can be applied by the intaglio, flexographic, screen printing or pigment printing process or by the spraying, spreading or knife coating process.

The Examples which follow further illustrate the invention. Percentages are by weight.

EXAMPLES

Example 1

217.4 g of a 23% strength press cake (corresponding to 50 g of pigment) of Pigment Yellow 83 (C.I. 21 108) were suspended in 200 ml of water and admixed with 31.2 g of a 25% strength solution of a surfactant (obtained by reacting ethylenediamine with propylene oxide then with ethylene oxide; ethylene oxide content: 80%, molecular weight: 30,000) in 3:1 (v/v) water/isopropanol. This suspension was stirred at 50° C. for one hour and filtered with suction, and the filter residue was dried at 80°-90° C.

The powder thus obtained contains 86.5% of pigment and, used in flexographic printing, it produces strong and glossy prints.

Example 2

To 550 g of an aqueous suspension of Pigment Yellow 13 (C.I. 21 100) (corresponding to 36 g of pigment) were added 13.5% (based on 100% of pigment) of the surfactant mentioned in Example 1, and the mixture was processed as described in Example 1.

Drying left 40 g of a pigment formulation which produces highly glossy and transparent prints.

Example 3

187.3 g of a 26.7% strength press cake (corresponding to 50 g of pigment) of Pigment Orange 5 (C.I. 12 075) were suspended with 10.4 g of a 75% strength solution of a surfactant (as described in Example 1) and 300 ml of water at 60° C. for an hour. This suspension was then cooled down to room temperature and filtered with suction, and the filter residue was dried in a drying cabinet.

The pigment formulation thus obtained can be used to prepare water-thinnable flexographic and intaglio printing inks of high color strength, high translucence, high gloss and very good flow characteristics.

Example 4

To a suspension of Pigment Red 57 (C.I. 15 850), which had been freed from reaction salts by repeated decanting, were added, based on pigment, to 15% of a surfactant (as described in Example 1). Following stirring at 60° C. for one hour and subsequent cooling to room temperature, the aqueous suspension was converted into a powder by spray drying.

This powder is highly suitable for high-quality waterborne flexographic and intaglio printing inks.

Example 5

Example 4 was repeated with Pigment Red 48:1 (C.I. 15 865:1). The result obtained was a pigment formulation which can be converted into a flexographic or intaglio printing ink by simply stirring it into an aqueous acrylate lacquer. The printing ink is highly suitable for producing high gloss prints.

Example 6

A 30% strength aqueous press cake of Pigment Red 112 (C.I. 12 370) was thoroughly mixed in a commercial mixer with 13.5% of a surfactant (as described in Example 1). Cabinet drying and grinding gave a readily dispersible pigment formulation of high gloss and translucence.

Example 7

100 g of a finely divided crude copper phthalocyanine (obtained by ball milling) were added together with 56 g of isobutanol to a hot solution of 15.6 g of a surfactant (obtained by reacting ethylenediamine with propylene oxide and then with ethylene oxide; ethylene oxide content 75%; molecular weight: about 30,000) in 200 ml of water at 60° C., and the mixture was heated at 90° C. for 4 hours with stirring. Filtration and drying left 115.4 g of a β-copper phthalocyanine pigment. The formulation can be dispersed in an aqueous printing ink binder by stirring. The prints obtained show high gloss, translucence and color strength.

Example 8

265 g of a moist press cake of a crystalline β-copper phthalocyanine pigment, containing 100 g of pigment, were suspended in 600 ml of water at 60° C. and admixed with 15.6 g of a surfactant (as described in Example 1). Drying left 115 g of a β-copper phthalocyanine pigment having excellent properties in aqueous flexographic and intaglio printing inks.

Example 9

140 g of a moist press cake of a copper phthalocyanine pigment of the α-modification (corresponding to 50 g of pigment) were suspended in 200 ml of water and mixed at 60° C. with 10.25 g of a surfactant (obtained by reacting ethylenediamine with propylene oxide and then with ethylene oxide; ethylene oxide content: 70%; molecular weight: about 25,000), and the mixture was stirred for 2 hours. Filtration and drying left 60 g of a copper phthalocyanine pigment of the α-modification, which gives excellent gloss and translucence values in waterborne printing inks.

Example 10

100 g of a moist press cake of Pigment Green 7 (C.I. 74 260), corresponding to 50 g of pigment, were suspended in 160 ml of water at 60° C. and homogenized with 7.5 g of a surfactant (as described in Example 1) at 90° C. for 2 hours. Spray drying gave 57 g of a copper phthalocyanine pigment of excellent dispersibility and color strength in waterborne printing inks.

We claim:

1. A solid pigment formulation containing from 70 to 97% by weight, based on the total weight of the formulation, of one or more pigments and also from 3 to 30% by weight, based on the total weight of the formulation, of at least one surfactant which is an adduct of ethylene oxide and optionally propylene oxide with ethylenediamine, the proportion of ethylene oxide being from 46 to 100% by weight, based on the total weight of ethylene oxide and propylene oxide in the adduct, and the adduct having an average molecular weight of from 5000 to 40,000.

2. A solid pigment formulation as claimed in claim 1, containing from 75 to 97% by weight, based on the total weight of the formulation, of one or more pigments and also from 3 to 25% by weight, based on the total weight of the formulation, of at least one surfactant.

3. A solid pigment formulation as claimed in claim 1, wherein the surfactant is an adduct of ethylene oxide and propylene oxide with ethylenediamine in which the proportion of ethylene oxide is from 60 to 90% by weight, based on the total weight of ethylene oxide and propylene oxide in the adduct.

4. A solid pigment formulation as claimed in claim 1, wherein the surfactant has an average molecular weight of 11,000 to 40,000.

5. A solid pigment formulation as claimed in claim 1, wherein the pigments are inorganic pigments, organic pigments or mixtures thereof.

6. A solid pigment formulation as claimed in claim 1, containing as inorganic pigments iron oxide, titanium dioxides, carbon blacks, lead chromate/lead molybdate pigments, nickel titanium yellow pigments or chromium(III) oxide.

7. A solid pigment formulation as claimed in claim 1, containing as organic pigments those of the class of the monoazo pigments, laked monoazo dyes, disazo pigments, fused disazo pigments, isoindoline derivatives, derivatives of naphthalene- or perylene-tetracarboxylic acid, anthraquinone pigments, thioindigo derivatives, azomethine derivatives, quinacridones, perinones, dioxazines, pyrazoloquinazolones, keto-containing polycyclic compounds having at least 4 fused aromatic and/or heteroaromatic rings, phthalocyanine pigments or laked basic dyes.

8. A method of using a solid pigment formulation as claimed in claim 1 for pigmenting aqueous or aqueous-alcoholic printing ink or gloss paint compositions.

9. A solid pigment formulation consisting essentially of from 70 to 95% by weight, based on the total weight of the formulation, of at least one pigment and from 3 to 30% by weight, based on the total weight of the formulation, of at least one surfactant which is an adduct of ethylene oxide and optionally propylene oxide with ethylenediamine, the proportion of ethylene oxide ranging from 46 to 100% by weight, based on the total weight of ethylene oxide and propylene oxide in the adduct, and the adduct having an average molecular weight of from 5,000 to 40,000.

* * * * *